United States Patent [19]

Cerny, Jr.

[11] Patent Number: 4,519,096
[45] Date of Patent: May 21, 1985

[54] LARGE DYNAMIC RANGE MULTIPLIER FOR A MAXIMAL-RATIO DIVERSITY COMBINER

[75] Inventor: Frank J. Cerny, Jr., North Riverside, Ill.

[73] Assignee: Motorola, Inc., Schaumburg, Ill.

[21] Appl. No.: 580,775

[22] Filed: Feb. 21, 1984

Related U.S. Application Data

[63] Continuation of Ser. No. 493,802, May 12, 1983, abandoned, which is a continuation of Ser. No. 268,613, Jun. 1, 1981, abandoned, which is a continuation of Ser. No. 84,980, Oct. 15, 1979, abandoned.

[51] Int. Cl.³ .............................................. H04B 7/08
[52] U.S. Cl. .................... 455/137; 307/498; 307/501; 307/529; 328/160; 455/273
[58] Field of Search ................ 455/52, 65, 137–139, 455/273, 333, 303–306; 328/160; 364/841; 307/498, 501, 529

[56] References Cited

U.S. PATENT DOCUMENTS

| | | | |
|---|---|---|---|
| 2,683,213 | 7/1954 | Earp | 455/139 |
| 3,471,788 | 10/1969 | Bickford et al. | 455/273 |
| 3,716,730 | 4/1971 | Cerny, Jr. | 455/333 |
| 4,100,432 | 7/1978 | Miyakawa et al. | 307/498 |

Primary Examiner—Marc E. Bookbinder
Attorney, Agent, or Firm—Rolland R. Hackbart; Edward M. Roney; James W. Gillman

[57] ABSTRACT

An improved large dynamic range multiplier is disclosed that provides substantially ideal multiplication for signals within a maximal-ratio predetection diversity combiner. Linear product multiplication is necessary in the second mixing stage of the maximal-ratio predetection diverstiy combiner, where it is essential that the mixer product signal be proportional to the product of its input signals, which each have a dynamic range in excess of 40 db. The multiplier, which in the preferred embodiment of the present invention is a field-effect-transistor device, provides a product signal that has a linear dynamic range approaching 130 db, far in excess of the 80 db necessary to accommodate typical input signals having a 40 db dynamic range.

28 Claims, 4 Drawing Figures

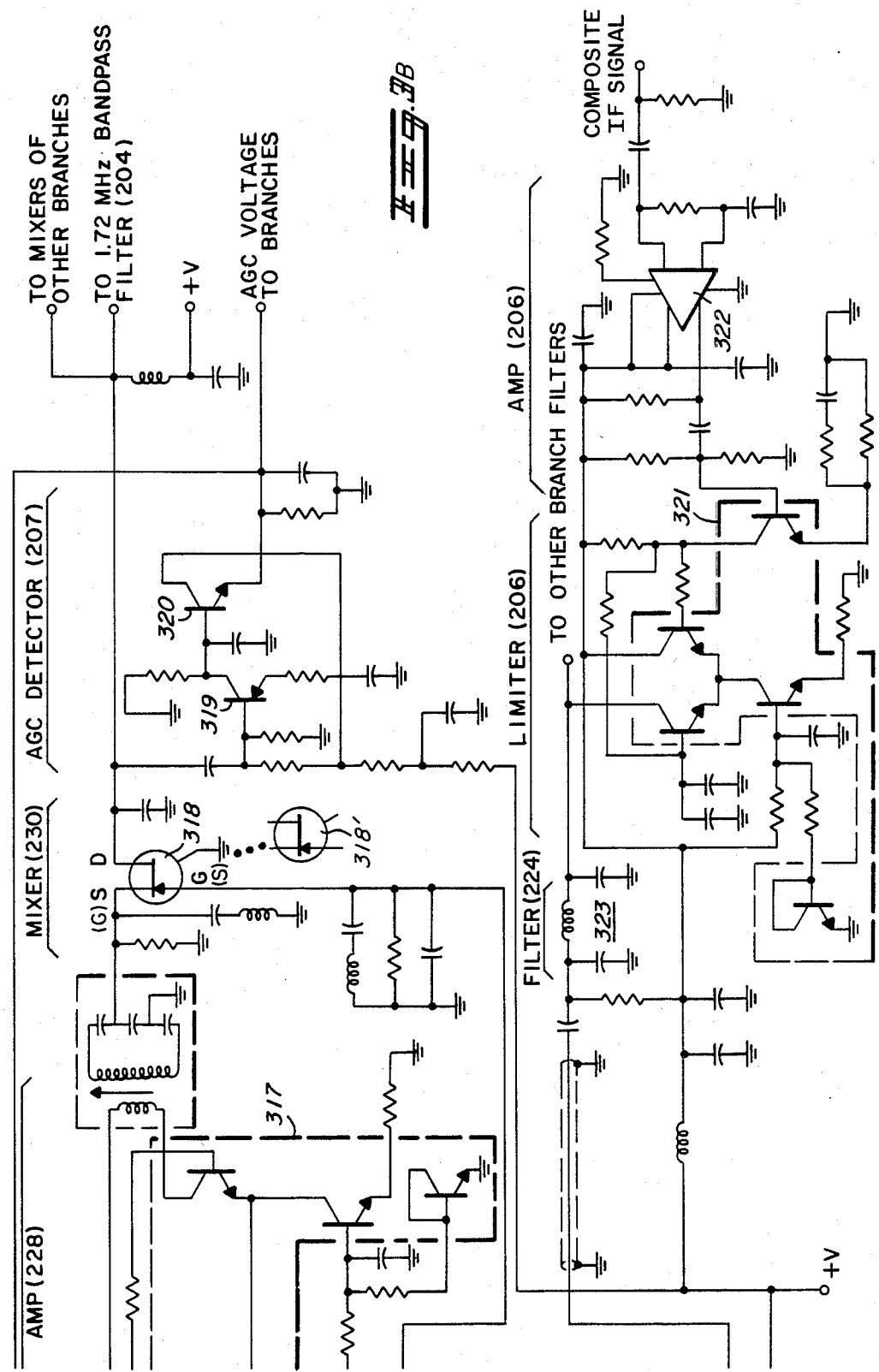

LARGE DYNAMIC RANGE MULTIPLIER FOR A MAXIMAL-RATIO DIVERSITY COMBINER

This application is a continuation of application Ser. No. 493,802 filed May 12, 1983 and now abandoned, which is a continuation of application Ser. No. 268,613 filed June 1, 1981 and now abandoned, which is a continuation of application Ser. No. 84,980 filed Oct. 15, 1979 and now abandoned.

BACKGROUND OF THE INVENTION

This invention relates to diversity combining systems and, more particularly, to a large dynamic range multiplier for maximal-ratio diversity combiners.

The need for space diversity combining arises in mobile radio systems because the radio-frequency (RF) signal path between a mobile transmitter and a base receiver is generally not line of sight, but instead consists of many reflected and scattered RF signal paths having varying amplitudes and phases. Furthermore, in mobile radio systems operating at relatively high frequencies, for example at 800 MHz, deep, rapid fading, commonly referred to as Rayleigh fading, must be contended with. By utilizing an antenna array having space diversity, the foregoing effects may be substantially reduced. According to space diversity, antennas of an antenna array are spaced at predetermined distances from one another, for example, at a distance of at least one-quarter wavelength from one another. The probability that deep fades will occur simultaneously at all antennas of a space-diversity antenna array will be extremely low. Thus, a composite signal formed by coherently combining each of the RF signals from a space-diversity antenna array will theoretically have a signal level at least as high as the strongest RF signal received by the antenna array.

One practical prior art technique of coherently combining the antenna RF signals from a space-diversity antenna array is known as "equal-gain predetection diversity combining". Exemplary equal-gain predetection diversity combiners are those described in an article by D. Brennan entitled, "Linear Diversity Combining Techniques", published by IRE Proceedinngs, June 1959, at pp. 1075 to 1101 and in U.S. Pat. No. 3,471,788 to W. S. Bickford et al. In these prior art combiners, the antenna signals are converted to intermediate frequency (IF) signals which are then cophased with one another and thereafter linearly combined to provide a composite IF signal. For example, the IF signals developed from each antenna RF signal may be phase aligned with a locally generated signal of a reference frequency, or may be phase aligned to a selected one of the IF signals, or may be phase aligned with respect to the composite IF signal. Once the IF signals from each antenna RF signal are cophased with one another, they may then be linearly added by appropriate circuitry to provide a coherent composite IF signal which is the vector sum of the individual IF signals.

In order to cophase each IF signal, prior art equal-gain predetection diversity combiners include circuitry, commonly referred to as a "branch", for dividing the IF signal into first and second portions, mixing the first portion with a reference signal to provide a first product signal that has a phase equal to the difference in phase between the first portion and the reference signal, and mixing the first product signal with the second portion of the IF signal to provide a second product signal that will be cophased with the reference signal. Since the second product signals of each branch are cophased with one another, they may then be linearly added by appropriate circuitry to provide the composite coherent IF signal. If the second portion of the IF signal and the first product signal were each amplified linearly so that the magnitude of each would be proportional to the input IF signal, the magnitude of the second product signal would theoretically be proportional to the square of the magnitude of the input IF signal. However, in the conceptual design of the prior art equal-gain combiner, the first product signal is amplitude limited prior to the input to the second stage of mixing. Consequently, the second product signal will be directly proportional to the magnitude of the input IF signal rather than to its square.

In such equal-gain combining systems, it is necessary that all of the antenna RF signals must have substantially the same mean signal level due to the fact that the first product signal is amplitude limited prior to the second mixing. Because the first product signal is amplitude limited, the second product signal from the second stage of mixing will not be proportional to the square of the magnitude of the input IF signal. Thus, if IF signals received by all branches do not have substantially the same mean signal level, the composite IF signal may be significantly degraded in signal-to-noise ratio since a weak signal received by one branch will be weighted substantially equally with a strong signal received by another branch.

The foregoing inadequacy of prior art equal-gain predetection diversity combiners may be improved by utilizing the prior art combining technique known as "maximal-ratio predetection combining". In such maximal-ratio predetection combining systems, signals are not limited prior to the second mixing in each of the branches. It is desired that all signals are proportionally related to the input IF signal so that the magnitude of the second product signal will be proportional to the square of the magnitude of the input IF signal. As a result, branches receiving strong signals will receive more emphasis than branches receiving weak signals.

Since Rayleigh fading experienced in 800 MHz systems may cause instantaneous amplitude variations between the RF signals received at different antennas of a space-diversty antenna array that are in excess of 40 decibels (db), the linear dynamic range of the branch circuitry must accommodate IF signals having at least a 40 db dynamic range and second product signals having amplitude variations in excess of 80 db, which is twice the dynamic range of the input IF signals due to the squaring by the second mixing operation. Thus, the particular circuit implementation for providing the second mixing operation must provide substantially idealized multiplication over an extremely large dynamic range.

A prior art product multiplier capable of providing the desired performance over an output dynamic range in excess of 80 db has not been practically achieved in the past. Commercially available linear integrated-circuit balanced mixers such as the Motorola MC1596 have been utilized as the second mixer in maximal ratio combiners designed for military applications. These integrated circuit mixers consist of a quad differential amplifier with cross-coupled outputs to provide full-wave balanced multiplication of the two input signals. Each differential pair is powered by a constant current source. Such a mixer will not accommodate input signals having a dynamic range in excess of 30 db, since its linear output dynamic range is only 50 to 60 db. A doubly-balanced FET mixer, such as that described by Highleyman and Jacob in the article, "An Analog Multiplier Using Two Field Effect Transistors", IRE Transactions on Communications Systems, Vol. CS-10, pp. 311–317, September, 1962, may also be used for the second mixing operation with some expected improvement in dynamic range, but without any appreciable reduction in complexity or cost.

Accordingly, it is an object of the present invention to provide an improved low-cost, large dynamic range product multiplier for a maximal-ratio predetection diversity combiner that coherently combines a plurality of amplitude and phase varying input signals of substantially the same frequency.

It is another object of the present invention to provide an improved low-cost, large dynamic range product multiplier for a maximal-ratio predetection diversity combiner suitable for use in a diversity receiver for coherently combining RF signals having a dynamic range in excess of forty decibels (40 dB).

SUMMARY OF THE INVENTION

According to the invention, there is provided a maximal-ratio predetection diversity combiner for coherently combining over a predetermined dynamic range a plurality of input signals of substantially the same frequency that have unknown and varying phases and magnitudes with respect to one another. The plurality of input signals are co-phased with each other within the combiner so that these signals are phase-coherent with each other prior to being linearly summed together at the output of the combiner. Furthermore, the amplitude of each input signal is, in effect, squared within the combiner prior to the linear summation to give greater emphasis to the signals having the larger magnitudes.

For each input signal, the maximal-ratio predetection combiner includes: circuitry for dividing the input signal into first and second portions; a first mixer for multiplying the first portion of the input signal with a reference signal that is produced within the combiner to provide a first product signal having a phase that is the difference between the phase of the input signal and the reference signal; a filter network for providing a variable phase shift to the first product signal with the phase shift being a function of the frequency of the first product signal; and a second mixer for multiplying the second portion of the input signal with the phase-shifted first product signal to provide a second product signal that is substantially independent of the phase of the original input signal. The second product signals, which are each cophased with the reference signal, may then be linearly combined by combining circuitry to provide a composite coherent IF signal.

The second mixer of the maximal-ratio diversity combiner preferably is a field-effect transistor device that proportionally multiplies, over the predetermined dynamic range of the combiner, the second portion of the input signal and the first product signal to provide the second product signal. Thus, the magnitude of the second product signal is proportional to the square of the magnitude of the respective input signal. Therefore, since strong input signals receive more emphasis than weak input signals, the signal-to-noise degradation from the weak input signals is greatly reduced. Since a single FET device provides essentially ideal multiplication, the second product signal is proportional to the square of the respective input signal over the entire dynamic range of the input signal, which, in some applications, may be in excess of forty decibels (40 db) for the input signal.

DETAILED DESCRIPTION OF THE PREFERRED EMBODIMENT

Figure 1:
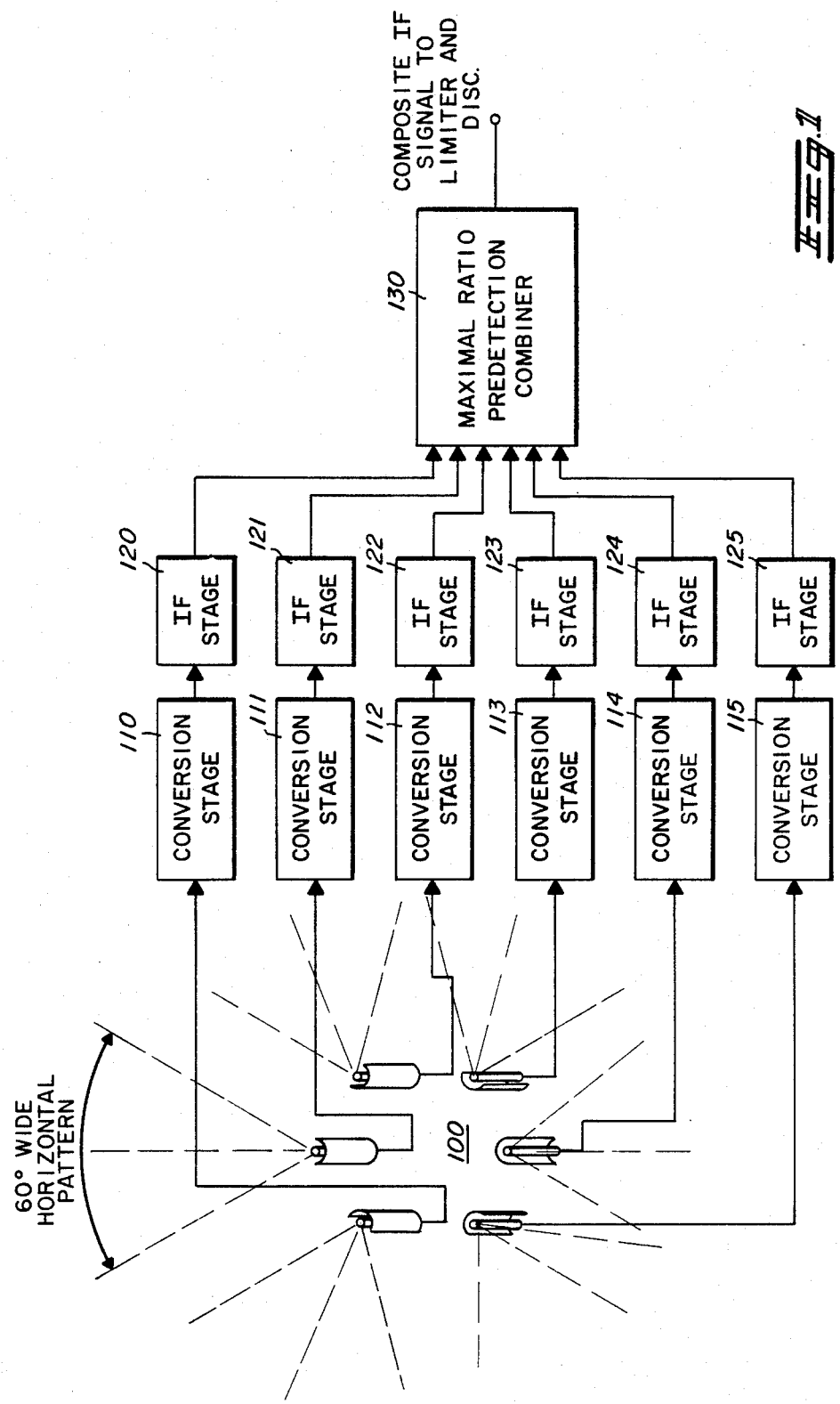
FIG. 1 is a block diagram of a diversity receiving system that may advantageously utilize the present invention.

In FIG. 1, there is illustrated a diversity receiver including six directional sector antennas in an antenna array 100, conversion stages 110–115, IF selectivity stages 120–125 and a maximal-ratio predetection diversity combiner 130. The signal received by each directional sector antenna is tuned to the same radio frequency by the conversion stages 110–115. The diversity receiver of FIG. 1 may be advantageously utilized at the base station of a mobile radio system, such as the system described in the Federal Communications Commission filing by American Radio Telephone Service, Inc., of Baltimore, Md., entitled "An Application For A Developmental Cellular Mobile and Portable Radio Telephone System In The Washington-Baltimore Northern Virginia Area", filed on Feb. 14, 1977, and in copending application, Ser. No. 022,757 (now U.S. Pat. No. 4,369,520) by Frank J. Cerny, Jr., and James J. Mikulski, entitled "Instantaneously Acquiring Sector Antenna Combining System", filed on Mar. 22, 1979, assigned to the same assignee as the instant application and incorporated herein by reference thereto. Prior to the aforementioned copending application, radio-telephone systems have typically utilized omnidirectional antennas, as shown in U.S. Pat. No. 3,471,788, instead of high-gain directional sector antennas as shown in this copending application, for providing omnidirectional coverage. By utilizing a maximal-ratio predetection diversity combiner 130 with a directional antenna array 100 comprised of a plurality of directional gain antennas whose patterns are spatially distributed to provide an omnidirectional pattern, the effective coverage area of the antenna array may be substantially increased while providing an omnidirectional receiving pattern. However, systems utilizing antenna arrays comprised of either directional or omnidirectional antennas may advantageously utilize the present invention.

The signals received by each antenna of the antenna array 100 are converted to an intermediate frequency by conversion stages 110–115, filtered by IF stages 120–125, and applied to maximal ratio predetection combiner 130. The combiner 130 continuously cophases the branch IF signals received from each antenna of the antenna array 100 and thereafter linearly adds these cophased branch IF signals together to provide a composite IF signal. In combining the branch IF signals, it is desirable that signal-to-noise ratio degradations which may be introduced by low-level signals or deep nulls received by one or more of the sector antennas of the antenna array 100, be avoided. Thus, the entire diversity receiver should be capable of linearly accommodating the expected dynamic range of each sector antenna signal from the antenna array 100. The expected dynamic range should be linearly accommodated not only by the conversion stages 110–115 and the IF stages 120–125 but also by the maximal-ratio predetection diversity combiner 130. It has been found that, in order to provide optimum suppression of the noise pops due to Rayleigh fading, a linear dynamic range of at least 40 db should be maintained throughout the diversity receiver of FIG. 1. Thus, in order to provide a linear dynamic range for the maximal-ratio predetection diversity combiner 130, it is necessary that the second multiplier (230 of FIG. 2) provide essentially ideal multiplication so that the multiplier product signal is proportional to the product of the magnitudes of the multiplier input signals over the entire dynamic range of each multiplier inpug signal. Prior art combiners have failed to provide such proportional multiplication for signals having a linear dynamic range in excess of 40 db.

In accordance with the present invention, it has been found that a FET device will provide essentially ideal multiplication over the wide dynamic range encountered in maximal ratio predetection combiners. The FET device is preferably biased such that the quiescent gate-to-source voltage is approximately one-half of the gate pinchoff voltage. In other words, the FET device is biased to operate within its active region, the drain-to-source channel being biased within the pinch-off region by applying the $+V$ d.c. voltage to the drain (see FIG. 3B), and the gate-to-source junction being reverse-biased by a d.c. voltage developed across a resistor between the source and ground which is approximately one-half of the FET's gate pinch-off voltage. The two signals to be multiplied are applied to the gate and source terminals of the FET device, respectively. By filtering the FET drain current, $i_d$, at the difference frequency, $w_1 - w_2$, the following equation is obtained:

$$i_d = (I_{DSS}/V_p^2) V_1 V_2 \cos(w_1 - w_2)t$$

where $I_{DSS}$ = the steady state drain saturation current;
$V_P$ = the gate pinchoff voltage;
$V_1$ = the magnitude of the input signal at radian frequency $w_1$; and
$V_2$ = the magnitude of the input signal at radian frequency $w_2$.

The development of the forgoing equation for a FET operating within its active region is described in detail in my prior U.S. Pat. No. 3,716,730, incorporated herein by reference thereto.

According to the present invention, an active FET device biased as described hereinabove will provide substantially ideal multiplication as predicted by the foregoing equation as long as the FET input signal levels are properly ratioed. For example, a Siliconix U-310 FET is capable of providing a product signal having a dynamic range in excess of 130 db. For the U-310 FET, one decibel of output compression (indicating the limit of linear product multiplication) occurs when the gate signal level is $-3$ dbm or the source signal level is $+9$ dbm. Assuming that a receiver requires an input signal level of $-112$ dbm to provide a 20 db quieting signal, the threshold levels for the gate signal may be set at $-62$ dbm and the source signal at $-50$ dbm (total of $-112$ dbm). Thus, the signals at the gate and source terminals of the FET may each vary over a dynamic range of 59 db (e.g. for the gate, $-3$ dbm$-[-62$ dbm$]=59$ db) without producing output compression. Furthermore, if the signal-to-noise ratio of the receiver IF circuitry is 7 db for a 20 db quieting signal, the signals at the gate and source terminals may each vary over a dynamic range of 66 db (i.e. 59 db$+7$ db$=66$ db). Thus, the FET product signal has a dynamic range that is 132 db, twice the dynamic range of the signals at the gate and source terminals.

Figure 2:
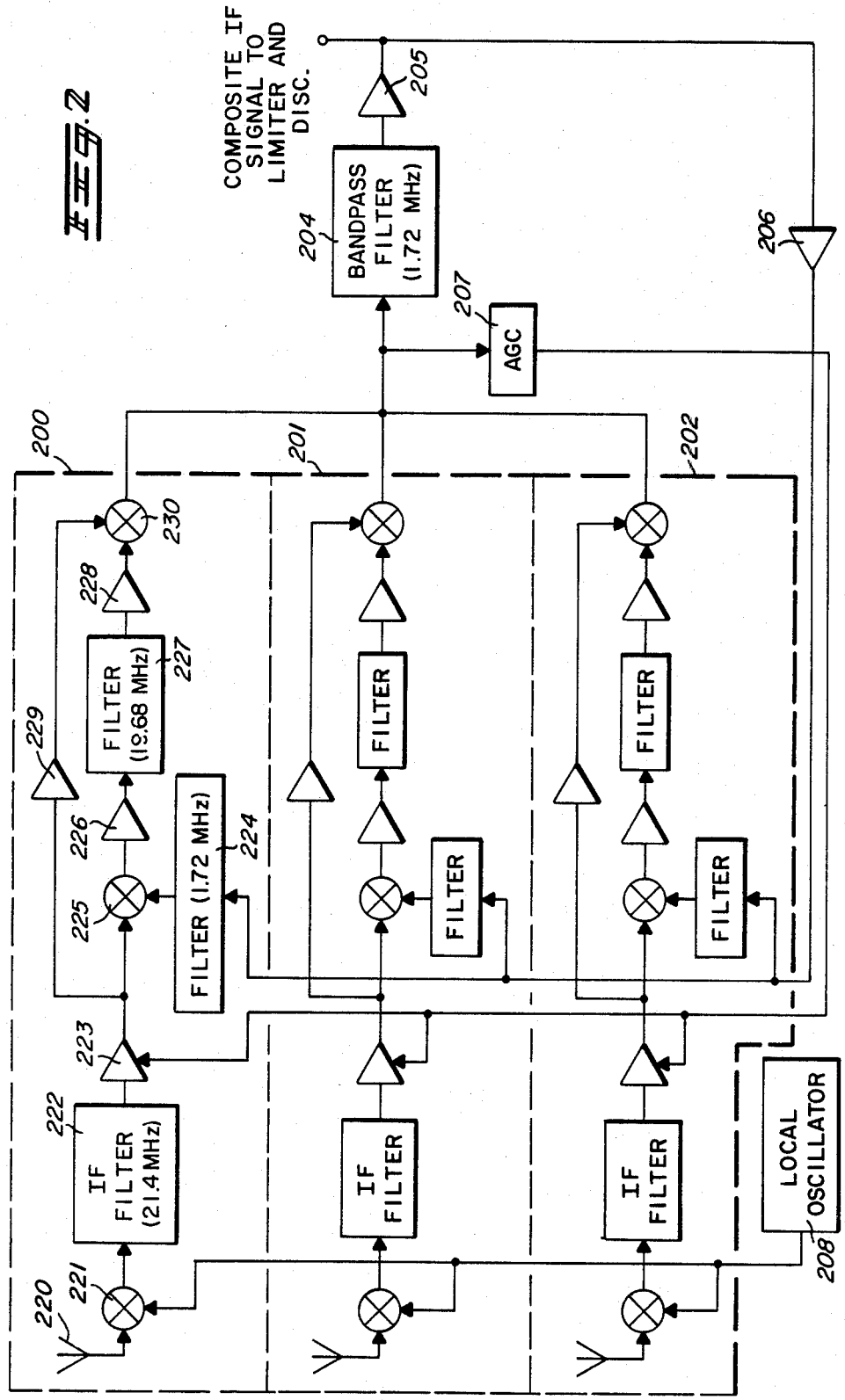
FIG. 2 is a block diagram of a maximal-ratio predetection diversity combiner which may advantageously utilize the present invention.

In FIG. 2, there is illustrated a more detailed block diagram of the diversity receiver of FIG. 1, as shown in the aforementioned copending application. The diversity receiver of FIG. 2 shows only three of the six branches of the diversity receiver of FIG. 1, although any number of branches may be utilized in practicing the present invention. Branches 200, 201 are comprised of substantially identical circuitry, each branch providing a product signal that is both phase coherent with the outer branch product signals and proportional to the square of the magnitude of the signal received by its respective sector antenna.

In the diversity receiver of FIG. 2, the frequency of local oscillator 208 determines which ratio channel the diversity receiver is tuned to. The RF signal received by each branch sector antenna 220 is combined by mixer 221 with the signal from local oscillator 208 to provide an IF signal at 21.4 MHz. The IF signal from mixer 221 is then applied to IF bandpass filter 222, which may be a monolithic bandpass filter of conventional design similar to that described in U.S. Pat. No. 3,716,808, incorporated herein by reference thereto. The filtered IF signal from filter 222 is then applied to IF amplifier 223. The output from IF amplifier 223 is split and fed forward via two paths to mixer 230. The first portion of the IF signal is linearly amplified by IF amplifier 229 and thereafter applied to mixer 230. IF amplifier 229 linearly amplifies the first portion of the IF signal to provide a signal level that is within the input dynamic range of mixer 230. The second portion of the IF signal is applied to mixer 225 together with the 1.72 MHz composite IF signal which is fed back via amplifier 206 and filter 224. By feeding back the IF signal, the IF strip of the diversity receiver forms a closed feedback loop that is regenerative on noise. Thus, the randomly varying phase of each branch IF signal relative to the composite IF signal is added into the closed loop via mixer 225, and then substracted out at mixture 230. By this process, the random phase variations are removed from each branch IF signal in relation to the composite IF signal. The result is that each branch IF output signal is cophased to the composite IF signal. Alternatively, in other arrangements, the branch IF signals need not be cophased with the composite IF signal, but may be cophased to a locally generated reference signal.

Referring back to branch 200, the component of the output signal from mixer 225 at the difference frequency of 19.68 MHz has a relative phase which is the difference between the phase of the branch IF signal at 21.4 MHz and the composite IF signal at 1.72 MHz. This resultant output signal is linearly amplified by second IF amplifier 226 and applied to bandpass filter 227 to provide a variable phase shift to the resultant signal. Filter 227 may be a two-pole crystal filter having a center frequency of 19.68 MHz and passband bandwidth of 2 KHz. The phase shift, provided by filter 227, is a function of the absolute frequency of the resultant signal. The signal from filter 227 is linearly ampified by third IF amplifier 228 to provide a signal level that is within the input dynamic range of mixer 230; this amplified signal is applied to the second input of mixer 230. Mixer 230 multiplies the amplified 19.68 MHz difference product signal from amplifier 228 with the amplified 21.4 MHz IF signal from amplifier 229 to provide a resultant output product signal having a 1.72 MHz difference frequency that is cophased with the composite IF signal, thus being substantially free of the random phase variations of the input IF signals. The phase difference resulting from mixer 225 is substracted from the phase of the amplified 21.4 MHz IF signal from amplifier 225 to produce the 1.72 MHz difference product signal from mixer 230, which is cophased with the composite IF signal and free from the random phase variations of the branch IF signal. The resultant output signal from mixer 230 is proportional to the square of the level of the input IF signal to that branch. The resultant output signals from the mixer 230 of each branch are linearly added together to form one composite IF signal at 1.72 MHz. This composite IF signal is the output signal from the maximal ratio predetection diversity combiner; it is fed to a 1.72 MHz IF bandpass filter 204 and fourth IF amplifier 205. The composite IF signal from amplifier 205 may then be applied to a conventional demodulator that is appropriate for recovering the method of information modulation being utilized within the system. The composite IF signal from amplifier 205 is further amplified and then amplitude limited by fifth IF amplifier 206 to provide a high-level amplitude-limited composite IF signal which is applied to each mixer 225 through each filter 224. Filter 224 may be either a bandpass filter or a low-pass filter having an operating frequency of 1.72 MHz. Automatic gain control is applied to all branches of the combiner by controlling the gain of each IF amplifier 223 with an AGC control voltage from AGC circuitry 207. This control voltage may be obtained by rectifying, amplifying, and low-pass filtering a portion of the composite IF signal from the output of mixer 230.

Figure 3A:
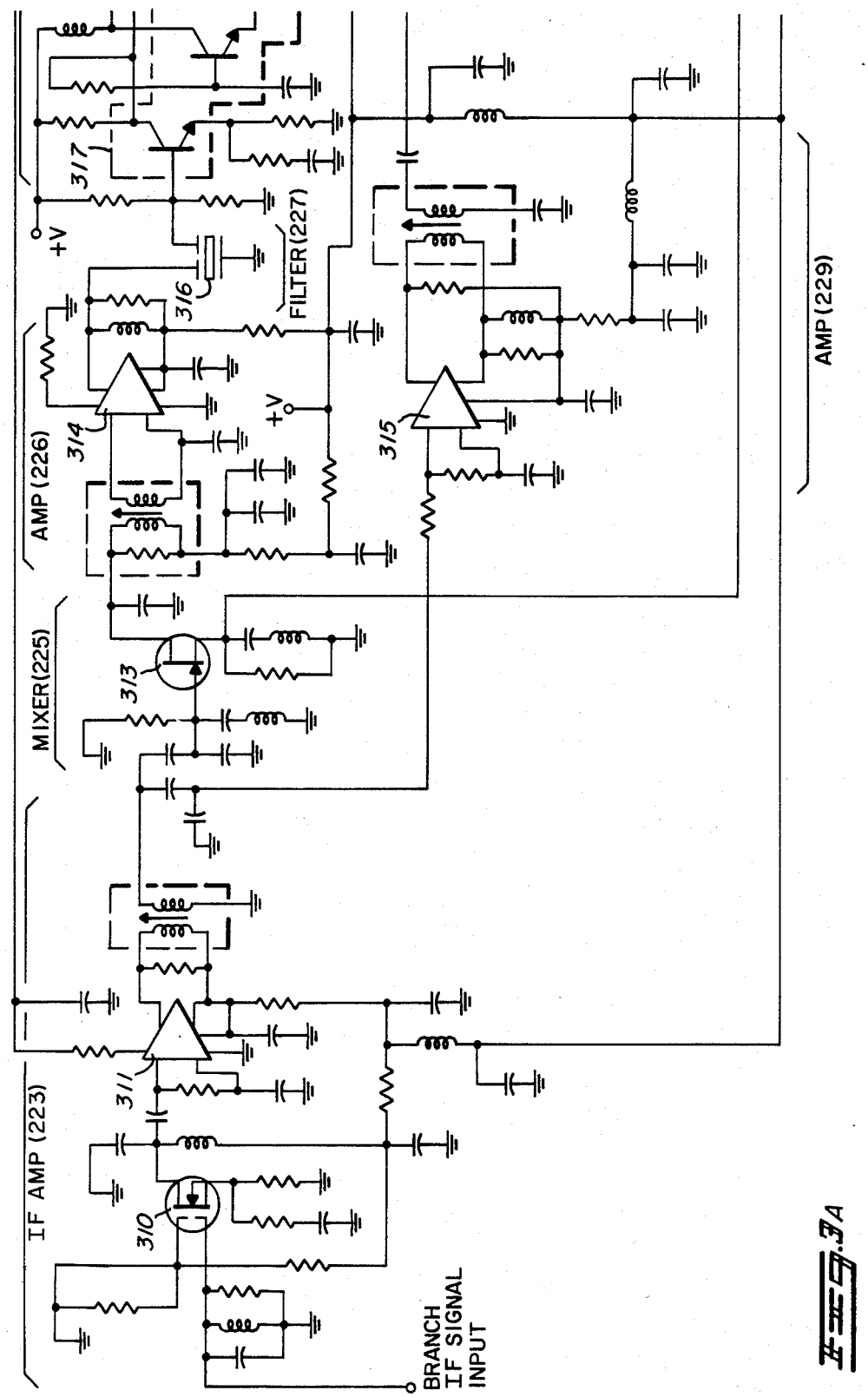
FIG. 3, including FIGS. 3A and 3B taken together, is a detailed circuit diagram of a portion of the circuitry in each branch of FIG. 2, together with a portion of the circuitry of FIG. 2 common to all of the branches.

FIGS. 3A and 3B taken together illustrate in detail the corresponding blocks of the circuitry of FIG. 2. Each branch 200, 201 and 202 of FIG. 2 contains essentially the same circuitry that is illustrated in FIGS. 3A and 3B. In FIG. 3A, the branch IF signal applied to FET device 310 is the signal provided by IF filter 222 of FIG. 2. Each designated portion of FIGS. 3A and 3B corresponds to the block of FIG. 2 identified in parentheses after each designation.

Referring to FIG. 3A, the branch IF signal, having a nominal frequency of 21.4 MHz, is amplified by FET device 310, which may be a Motorola 3N204, before application to the IF amplifier and AGC stage consisting of amplifier 311, which may be a Motorola MC1350P. The output of this IF amplifier is then divided into two portions, one portion being applied to FET device 313, and the other portion being applied to amplifier 315. FET device 313, which may be a Motorola 2N4416, is biased to operate as a mixer. The FET device 313 mixes the signal from the this IF amplifier with a feedback signal derived from the composite IF signal. The output of FET device 313 is the transformer-coupled to amplifier 314, which may be a Motorola MC1350P. Amplifier 314 is biased to provide linear amplification to signals from FET device 313. The output of amplifier 314 is then filtered by a two-pole monolithic crystal filter 316, which has a center frequency of 19.68 MHz and a passband of 2 KHz. The monolithic crystal filter 316 provides for both narrow-band filtering and phase-shifting that is a function of the frequency of the signal from amplifier 314. The phase-shifted output from monolithic crystal filter 316 is then applied to amplifier 317, which may be an RCA CA3086. Amplifier 317 likewise provides linear amplification to signals from the monolithic crystal filter 316. The output of amplifier 317 is transformer-coupled to the source terminal of FET device 318. The second portion of the branch IF signal from IF amplifier 311 is coupled to amplifier 315, which also provides linear amplification. The output from amplifier 315, which may be a Motorola MC1350P, is transformer-coupled to the gate terminal of FET device 318. The drain terminal of FET device 318 is coupled to the +V d.c. voltage by a decoupling choke and bypass capacitor. The source terminal of FET device 318 is coupled to three paralleled devices, a capacitor, a biasing resistor, and a series-resonant capacitor and choke, which in turn are coupled to ground. The gate terminal of FET device 318 is coupled to three paralleled devices, a capacitor, a biasing resistor, and a series-resonant capacitor and choke, which in turn are coupled to ground.

In accordance with the present invention, FET device 318 proportionally multiplies the signals from amplifiers 317 and 315 to provide the 1.72 MHz difference product signal. The FET device 318 is preferably a large power FET device, such as the Siliconix U-310. According to another feature of the present invention, the product signals from the FET devices 318 of each branch may be combined simply by interconnecting the representive FET drain terminals. The drain terminals of FET devices 318 may be paralleled since the drain of a FET is essentially constant-current source (since it is operating as an active device with its drain-to-source channel being biased within the pinch-off region) when the load conductance is at least an order of magnitude larger than the output conductance of the FET device; the paralleling of the drain terminals of the FET devices of each branch does not degrade either the gain or the dynamic range of the individual FET devices. According to yet another feature of the present invention, additional FET devices 318' may be paralleled with the FET device 318 in each branch to provide an increased dynamic range from the paralleled FET devices. Thus, neither the intercoupling of the FET devices nor the paralleling of additional FET devices requires any additional circuitry. In addition, the connections from the amplifiers 315 and 317 to the FET device 318 may be reversed, such that the amplifier 317 is coupled to the gate terminal and amplifier 315 is coupled to the source terminal (indicated on FIG. 3B by "G" and "S" in parentheses).

The additional circuitry shown in FIG. 3B is primarily circuitry that is common to all of the branches of the diversity combiner. The AGC circuitry includes transistors 319 and 320, which are capacitively coupled to the drain terminals of the branch FET devices 318 for providing an AGC voltage therefrom. The transistors 319 and 320 may be any suitable silicon transistors, such as the Motorola MPS6517 and Motorola MSP6513, respectively. The composite IF signal is coupled to amplifier 322 and thereafter to limiter 321 for providing a feedback signal to FET device 313 of each branch of the diversity combiner. The feedback signal from limiter 321 is applied via a low-pass filter 323 to the FET device 313 of FIG. 3A. Amplifier 322 may be a Motorola MC1350P, and limiter 321 may be an RCA CA3086.

In summary, a maximal-ratio predetection diversity combiner has been described hereinabove which provides a composite IF signal having a dynamic range in excess of 100 db. The large dynamic range of the diversity combiner has been achieved by utilizing an active FET device to proportionally multiply linear IF signals over their entire dynamic range. The circuit configuration for achieving this result is very simple, not requiring a multitude of current sources, differential pair arrangements or balanced circuit arrangements. Thus, the cost of the inventive diversity combiner has been substantially reduced. The diversity combiner of the present invention may be expanded to accommodate a larger number of branches simply by paralleling additional branches with the drain terminal of the branch FET devices 318 of FIG. 3B.

I claim:

1. A maximal-ratio predetection diversity combiner for coherently combining a plurality of input signals each having a linear dynamic range exceeding forty decibels (40 db), having substantially the predetermined frequency and further having unknown and varying phases and magnitudes with respect to one another, said maximal ratio predetection diversity combiner comprising:

means for generating a reference signal having a predetermined reference frequency for each input signal;

for each input signal:

(i) means for dividing each input signal into first and second portions;

(ii) first means for multiplying the first portion of each input signal with the reference signal to provide a first product signal having a phase that is the difference between the phase of the input signal and the reference signal;

(iii) means for providing a variable phase shift to said first product signal, said phase shift being a function of the frequency of said first product signal; and (iv) second means for multiplying the second portion of each input signal and the corresponding phase shifted first product signal to provide a second product signal that is substantially co-phased with the reference signal and substantially independent of the phase of the input signal, said second multiplying means being comprised of only a single field-effect transistor (FET) having source, gate and drain terminals, said FET being predeterminedly biased as an active device with the drain-to-source channel of said FET biased within the FET's pinch-off region and the gate-to-source junction of said FET biased at substantially one-half of the FET's gate pinch-off voltage for multiplying the second portion of the input signal and the phase shifted first product signal to provide the second product signal, such that the magnitude of the second product signal is proportional to the product of the magnitudes of the second portion of the input signal and the first product signal over substantially twice the dynamic range of the corresponding input signal; and said FET's each being arranged such that the second portion of the input signal is coupled to the source terminal thereof, the phase shifted product signal is coupled to the gate terminal thereof, and the second product signal is provided at the drain terminal thereof; and the drain terminals of all FET's being connected to a common point for providing a phase coherent composite signal.

2. The diversity combiner according to claim 1, wherein the second multiplying means is a power FET that is biased such that the quiescent gate-to-source voltage is substantially one-half the gate pinch-off voltage of the power FET.

3. The diversity combiner according to claim 1, wherein the reference-signal generating means is coupled to the composite signal for developing a reference signal therefrom.

4. The diversity combiner according to claim 1, further including for each input signal: first amplifying means interposed between the dividing means and second multiplying means for linearly amplifying the second portion of the input signal; second amplifying means interposed between the first multiplying means and the variable phase shift providing means for linearly amplifying the first product signal; and third amplifying means interposed between the variable phase shift providing means and the second multiplying means for linearly amplifying the phase-shifted first product signal.

5. The diversity combiner according to claim 1, further including for said FET's of the second multiplying means: means for applying a biasing voltage to the drain terminal of all FET's; and for each FET, means for biasing the gate-source junction thereof at a voltage that is approximately one-half of the FET's gate pinchoff voltage.

6. A diversity receiving system comprising antenna array means a plurality of substantially independent antennas for receiving a radio signal of a predetermined frequency, each antenna providing an input signal, the input signals from the antennas having unknown and varying phases and magnitudes with respect to one another; converting means coupled to the input signals from the antennas for converting the frequency of the input signals to an intermediate frequency; intermediate frequency amplifying and filtering means coupled to the converted input signals from the converting means for filtering the converted input signals; and maximal-ratio predetection combining means coupled to the filtered input signals from the intermediate frequency amplifying and filtering means for coherently combining the filtered input signals to provide a phase coherent composite signal, said combining means including:

means for generating a reference signal having a predetermined reference frequency for each filtered input signal;

for each input signal:

(i) means for dividing each filtered input signal into first and second portions;

(ii) first means for multiplying the first portion of each filtered input signal with the reference signal to provide a first product signal having a phase that is the difference between the phase of the filtered input signal and the reference signal;

(iii) means for providing a variable phase shift to said first product signal, said phase shift being a function of the frequency of said first product signal; and (iv) second means for multiplying the second portion of each filtered input signal and the corresponding phase shifted first product signal to provide a second product signal that is substantially co-phased with the reference signal and substantially independent of the phase of the input signal, said second multiplying means being comprised of only a single field-effect transistor (FET) having source, gate and drain terminals, said FET being predeterminedly biased as an active device with the drain-to-source channel of said FET biased within the FET's pinch-off region and the gate-to-source junction of said FET biased at substantially one-half of the FET's gate pinch-off voltage for multiplying the second portion of the filtered input signal and the phase shifted first product signal to provide the second product signal, such that the magnitude of the second product signal is proportional to the product of magnitudes of the second portion of the filtered input signal and the first product signal over substantially twice the dynamic range of the corresponding input signal; and said FET's each being arranged such that the second portion of the input signal is coupled to the source terminal thereof, the phase shifted first product signal is coupled to the gate terminal thereof, and the second product signal is provided at the drain terminal thereof; and the drain terminals of all FET's being connected to a common point for providing the phase coherent composite signal.

7. The diversity receiving system according to claim 6, wherein the second multiplying means is a power FET that is biased such that the quiescent gate-to-source voltage is substantially one-half the gate pinch-off voltage of the power FET.

8. The diversity receiving system according to claim 6, wherein the reference signal generating means is coupled to the composite signal for developing a reference signal therefrom.

9. The diversity combiner according to claim 6, further including for each input signal: first amplifying means interposed between the dividing means and second multiplying means for linearly amplifying the second portion of the input signa; and second amplifying means interposed between the first multiplying means and the variable phase shift providing means for linearly amplifying the first product signal; and third amplifying means interposed between the variable phase shift providing means and the second multiplying means for linearly amplifying the phase-shifted first product signal.

10. The diversity combiner according to claim 6, further including for said FET's of the second multiplying means: means for applying a biasing voltage to the drain terminal of all FET's; and for each FET, means for biasing the gate-source junction thereof at a voltage that is approximately one-half of the FET's gate pinch-off voltage.

11. A maximal-ratio predetection diversity combiner for coherently combining a plurality of input signals each having a linear dynamic range exceeding forty decibels (40 db), having substantially the same predetermined frequency and further having unknown and varying phases and magnitudes with respect to one another, said maximal ratio predetection diversity combiner comprising:

means for generating a reference signal having a predetermined reference frequency for each input signal;

for each input signal:
(i) means for dividing each input signal into first and second portions;

(ii) first means for multiplying the first portion of each input signal with the reference signal to provide a first product signal having a phase that is the difference between the phase of the input signal and the reference signal;

(iii) means for providing a variable phase shift to said first product signal, said phase shift being a function of the frequency of said first product signal; and (iv) second means for multiplying the second portion of each input signal and the corresponding phase shifted first product signal to provide a second product signal that is substantially co-phased with the reference signal and substantially independent of the phase of the input signal, said second multiplying means being comprised of a plurality of field-effect transistors (FET) coupled in parallel with each other and each having source, gate and drain terminals, each of said FET's being predeterminedly biased as an active device with the drain-to-source channel of said FET biased within FET's pinch-off region and the gate-to-source junction of said FET biased at substantially one-half of the FET's gate pinch-off voltage for multiplying the second portion of the input signal and the phase shifted first product signal to provide the second product signal, such that the magnitude of the second product signal is proportional to the product of the magnitudes of the second portion of the input signal and the first product signal over substantially twice the dynamic range of the corresponding input signal; and said FET's each being arranged such that the second portion of the input signal is coupled to the source terminal thereof, the phase shifted first product signal is coupled to the gate terminal thereof, and the second product signal is provided at the drain terminal thereof; and the drain terminals of all FET's being connected to a common point for providing a phase coherent composite signal.

12. The diversity combiner according to claim 11, further including for each input signal: first amplifyting means interposed between the dividing means and second multiplying means for linearly amplifying the second portion of the input signal; second amplifying mean is interposed between the first multiplying means and the variable phase shift providing means for linearly amplifying the first product signal; and third amplifying means interposed between the variable phase shift providing means and the second multiplying means for linearly amplifying the phase-shifted first product signal.

13. The diversity combiner according to claim 1, further including for said FET's of the second multiplying means: means for applying a biasing voltage to the drain terminal of all FET's; and for each FET, means for biasing the gate-source junction thereof at the voltage that is approximately one-half of the FET's gate pinchoff voltage.

14. A diversity receiving system comprising antenna aray means having a plurality of substantially independent antennas for receiving a radio signal of a predetermined frequency, each antenna providing an input signal, the input signals from the antennas having unknown and varying phase and magnitudes with respect to one another; converting means coupled to the input signals from the antennas for converting the frequency of the input signals to an intermediate frequency; intermediate frequency amplifying and filtering means coupled to the converted input signals from the converting means for filtering the converted input signals; and maximal-ratio predetection combining means coupled to the filtered input signals from the intermediate frequency amplifyinig and filtering means for coherently combining the filtered input signals to provide a phase coherent composite signal, said combining means including:

means for generating a reference signal having a predetermined reference frequency for each filtered input signal;

for each input signal:
(i) means for dividing each filtered input signal into first and second portions;
(ii) first means for multiplying the first portion of each filtered input signal with the reference signal to provide a first product signal having a phase that is the difference between the phase of the filtered input signal and the reference signal;
(iii) means for providing a variable phase shift to said first product signal, said phase shift being a function of the frequency of said first product signal; and
(iv) second means for multiplying the second portion of each filtered input signal and the corresponding phase-shifted first product signal to provide a second product signal that is substantially co-phased with the reference signal and substantially independent of the phase of the input signal, said second multiplying means being comprised of a plurality of field-effect transistors (FET) coupled in parallel with each other and each having source, gate and drain terminals, each of said FET's bring predeterminedly biased as an active device with the drain-to-source channel of said FET biased within the FET's pinch-off region and the gate-to-source junction of said FET biased at substantially one-half of the FET's gate pinch-off voltage for multiplying the second portion of the filtered input signal and the phase shifted first product signal to provide the second product signal, such that the magnitude of the second product signal is proportional to the product of the magnitudes of the second portion of the filtered input signal and the first product signal over substantially twice the dynamic range of the corresponding input signal; and said FET's each being arranged such that the second portion of the input signal is coupled to the source terminal thereof, the phase shifted first product signal is coupled to the gate terminal thereof, and the second product signal is provided at the drain terminal thereof, and the drain terminals of all FET's being connected to a common point for providing the phase coherent composite signal.

15. The diversity combiner according to claim 14, further including for each input signal: first amplifying means interposed between the dividing means and second multiplying means for linearly amplifying the second portion of the input signal; second amplifying means interposed between the first multiplying means and the variable phase shift providing means for linearly amplifying the first product signal; and third amplifying means interposed between the variable phase shift providing means and the second multiplying means for linearly amplifying the phase-shifted first product signal.

16. The diversity combiner according to claim 14, further including for said FET's of the second multiplying means: means for applying a biasing voltage to the drain terminal of all FET's; and for each FET, means for biasing the gate-source junction thereof at a voltage that is approximately one-half of the FET's gate pinch-off voltage.

17. A maximal-ratio predetection diversity combiner for coherently combining a plurality of input signals each having a linear dynamic range exceeding forty decibels (40db), having substantially the same predetermined frequency and further having unknown and varying phases and magnitudes with respect to one another, said maximal ratio predetection diversity combiner comprising:

means for generating a reference signal having a predetermined reference frequency for each input signal;

for each input signal:
(i) means for dividing each input signal into first and second portions;
(ii) first means for multiplying the first portion of each input signal with the reference signal to provide a first product signal having a phase that is the difference between the phase of the input signal and the reference signal;
(iii) means for providing a variable phase shift to said first product signal, said phase shift being a function of the frequency of said first product signal; and
(iv) second means for multiplying the second portion of each input signal and the corresponding phase shifted first product signal to provide a second product signal that is substantially co-phased with the reference signal and substantially independent of the phase of the input signal, said second multiplying means being comprised of only a single field-effect transistor (FET) having source, gate and drain terminals, said FET being predeterminedly biased as an active device with the drain-to-source channel of said FET biased within the FET's pinch-off region and the gate-to-source junction of said FET biased at substantially one-half of the FET's gate pinch-off voltage, for multiplying the second portion of the input signal and the phase shifted first product signal to provide the second product signal, such that the magnitude of the second product signal is proportional to the product of the magnitudes of the second portion of the input signal and the first product signal over substantially twice the dynamic range of the corresponding input signal; and said FET's each being arranged such that the second portion of the input signal is coupled to the gate terminal thereof, the phase shifted product signal is coupled to the source terminal thereof, and the second product signal is provided at the drain terminal thereof; and the drain terminals of all FET's being connected to a common point for providing a phase coherent composite signal.

18. The diversity combiner according to claim 17, further including for each input signal: first amplifying means interposed between the dividing means and second multiplying means for linearly amplifying the second portion of the input signal; second amplifying means interposed between the first multiplying means and the variable phase shift providing means for linearly amplifying the first product signal; and third amplifying means interposed between the variable phase shift providing means and the second multiplying means for linearly amplifying the phase-shifted first product signal.

19. The diversity combiner according to claim 17, further including for said FET's of the second multiplying means: means for applying a biasing voltage to the drain terminal of all FET's and for each FET, means for biasing the gate-source junction thereof at a voltage that is approximately one-half of the FET's gate pinchoff voltage.

20. A maximal-ratio predetection diversity combiner for coherently combining a plurality of input signals each having a linear dynamic range exceeding forty decibels (40 db), having substantially the same predetermined frequency and further having unknown and varying phases and magnitudes with respect to one another, said maximal ratio predetection diversity combiner comprising:
  means for generating a reference signal having a predetermined reference frequency for each input signal;
  for each input signal:
    (i) means for dividing each input signal into first and second portions;
    (ii) first means for multiplying the first portion of each input signal with the reference signal to provide a first product signal having a phase that is the difference between the phase of the input signal and the reference signal;
    (iii) means for providing a variable phase shift to said first product signal, said phase shift being a function of the frequency of said first product signal; and
    (iv) second means for multiplying the second portion of each input signal and the corresponding phase shifted first product signal to provide a second product signal that is substantially co-phased with the reference signal and substantially independent of the phase of the input signal, said second multiplying means being comprised of a plurality of field-effect transistors (FET) coupled in parallel with each other and each having source, gate and drain terminals, each of said FET's being predeterminedly biased as an active device with the drain-to-source channel of said FET biased within the FET's pinch-off region and the gate-to-source junction of said FET biased at substantially one-half of the FET's gate pinch-off voltage for multiplying the second portion of the input signal and the phase shifted first product signal to provide the second product signal, such that the magnitude of the second product signal is proportional to the product of the magnitudes of the second portion of the input signal and the first product signal over substantially twice the dynamic range of the corresponding input signal; and
    said FET's each being arranged such that the second portion of the input signal is coupled to the gate terminal thereof, the phase shifted first product signal is coupled to the source terminal thereof, and the second product signal is provided at the drain terminal thereof; and the drain terminals of all FET's being connected to a common point for providing a phase coherent composite signal.

21. The diversity combiner according to claim 20, further including for each input signal: first amplifying means interposed between the dividing means and second multiplying means for linearly amplifying the second portion of the input signal; second amplifying means interposed between the first multiplying means and the variable phase shift providing means for linearly amplifying the first product signal; and third amplifying means interposed between the variable phase shift providing means and the second multiplying means for linearly amplifying the phase-shifted first product signal.

22. The diversity combiner according to claim 20, further including for said FET's of the second multiplying means: means for applying a biasing voltage to the drain terminal of all FET's; and for each FET, means for biasing the gate-source junction thereof at a voltage that is approximately one-half of the FET's gate pinch-off voltage.

23. A diversity receiving system comprising antenna array means having a plurality of substantially independent antennas for receiving a radio signal of a predetermined frequency, each antenna providing an input signal, the input signals from the antennas having unknown and varying phases and magnitudes with respect to one another; converting means coupled to the input signals from the antennas for converting the frequency of the input signals to an intermediate frequency; intermediate frequency amplifying and filtering means coupled to the converted input signals from the converting means for filtering the converted input signals; and maximal-ratio predetection combining means coupled to the filtered input signals from the intermediate frequency amplifying and filtering means for coherently combining the filtered input signals to provide a phase coherent composite signal, said combining means including:
  means for generating a reference signal having a predetermined reference frequency for each filtered input signal;
  for each input signal:
    (i) means for dividing each filtered input signal into first and second portions;
    (ii) first means for multiplying the first portion of each filtered input signal with the reference signal to provide a first product signal having a phase that is the difference between the phase of the filtered input signal and the reference signal;
    (iii) means for providing a variable phase shift to said first product signal, said phase shift being a function of the frequency of said first product signal; and
    (iv) second means for multiplying the second portion of each filtered input signal and the corresponding phase shifted first product signal to provide a second product signal that is substantially co-phased with the reference signal and substantially independent of the phase of the input signal, said second multiplying means being comprised of only a single field-effect transistor (FET) having source, gate and drain terminals, said FET being predeterminedly biased as an active device with the drain-to-source channel of said FET biased within the FET's pinch-off region and the gate-to-source junction of said FET biased at substantially one-half of the FET's gate pinch-off voltage for multiplying the second portion of the filtered input signal and the phase shifted first product signal to provide the second product signal, such that the magnitude of the second product signal is proportional to the product of the magnitudes of the second portion of the filtered input signal and the first product signal over substantially twice the dynamic range of the corresponding input signal; and said FET's each being arranged such that the second portion of the input signal is coupled to the gate terminal thereof, the phase shifted first product signal is coupled to the source terminal thereof, and the second product signal is provided at the drain terminal thereof; and the drain terminals of all FET's being connected to a common point for providing the phase coherent composite signal.

24. The diversity combiner according to claim 23, further including for each input signal: first amplifying means interposed between the dividing means and second multiplying means for linearly amplifying the second portion of the input signal; second amplifying means interposed between the first multiplying means and the variable phase shift providing means for linearly amplifying the first product signal; and third amplifying means interposed between the variable phase shift providing means and the second multiplying means for linearly amplifying the phase-shifted first product signal.

25. The diversity combiner according to claim 23, further including for said FET's of the second multiplying means: means for applying a biasing voltage to the drain terminal of all FET's and for each FET, means for biasing the gate-source junction thereof at a voltage that is approximately one-half of the FET's gate pinchoff voltage.

26. A diversity receiving system comprising antenna array means having a plurality of substantially independent antennas for receiving a radio signal of a predetermined frequency, each antenna providing an input signal, the input signals from the antennas having unknown and varying phases and magnitudes with respect to one another; converting means coupled to the input signals from the antennas for converting the frequency of the input signals to an intermediate frequency; intermediate frequency amplifying and filtering means coupled to the converted input signals from the converting means for filtering the converted input signals; and maximal-ratio predetection combining means coupled to the filtered input signals from the intermediate frequency amplifying and filtering means for coherently combining the filtered input signals to provide a phase coherent composite signal, said combining means including:

means for generating a reference signal having a predetermined reference frequency for each filtered input signal;

for each input signal:
(i) means for dividing each filtered input signal into first and second portions;

(ii) first means for multiplying the first portion of each filtered input signal with the reference signal to provide a first product signal having a phase that is the difference between the phase of the filtered input signal and the reference signal;

(iii) means for providing a variable phase shift to said first product signal, said phase shift being a function of the frequency of said first product signal; and (iv) second means for multiplying the second portion of each filtered input signal and the corresponding phase-shifted first product signal to provide a second product signal that is substantially co-phased with the reference signal and substantially independent of the phase of the input signal, said second multiplying means being comprised of a plurality of field-effect transistors (FET) coupled in parallel with each other and each having source, gate and drain terminals, each of said FET's bring predeterminedly biased as an active device with the drain-to-source channel of said FET biased within the FET's pinch-off region and the gate-to-source junction of said FET biased at substantially one-half of the FET's gate pinch-off voltage for multiplying the second portion of the filtered input signal and the phase shifted first product signal to provide the second product signal, such that the magnitude of the second product signal is proportional to the product of the magnitudes of the second portion of the filtered input signal and the first product signal over substantially twice the dynamic range of the corresponding input signal; and said FET's each being arranged such that the second portion of the input signal is coupled to the gate terminal thereof, the phase shifted first product signal is coupled to the source terminal thereof, and the second product signal is provided at the drain terminal thereof; and the drain terminals of all FET's being connected to a common point for providing the phase coherent composite signal.

27. The diversity combiner according to claim 26, further including for each input signal: first amplifying means interposed between the dividing means and second multiplying means for linearly amplifying the second portion of the input signal; second amplifying means interposed between the first multiplying means and the variable phase shift providing means for linearly amplifying the first product signal; and third amplifying means interposed between the variable phase shift providing means and the second multiplying means for linearly amplifying the phase-shifted first product signal.

28. The diversity combiner according to claim 26, further including for said FET's of the second multiplying means: means for applying a biasing voltage to the drain terminal of all FET's; and for each FET, means for biasing the gate-source junction thereof at a voltage that is approximately one-half of the FET's gate pinch-off voltage.

* * * * *

UNITED STATES PATENT AND TRADEMARK OFFICE
CERTIFICATE OF CORRECTION

PATENT NO. : 4,519,096
DATED      : May 21, 1985
INVENTOR(S) : Cerny, Jr.

It is certified that error appears in the above-identified patent and that said Letters Patent is hereby corrected as shown below:

Column 11, line 40, change "signa;" to --signal;--.

Column 12, line 46, change "mean is" to --means--.

Column 9, line 21 insert after "the" the word --same--.

Signed and Sealed this

Seventh Day of October, 1986

[SEAL]

*Attest:*

DONALD J. QUIGG

*Attesting Officer*  *Commissioner of Patents and Trademarks*